US005432859A

United States Patent [19]

Yang et al.

[11] Patent Number: 5,432,859

[45] Date of Patent: Jul. 11, 1995

[54] NOISE-REDUCTION SYSTEM

[75] Inventors: Jin Yang, Vancouver, Wash.; Andrew Sendyk, Calgary, Canada

[73] Assignee: NovAtel Communications Ltd., Calgary, Canada

[21] Appl. No.: 47,556

[22] Filed: Feb. 23, 1993

[51] Int. Cl.[6] .......... H04B 15/00

[52] U.S. Cl. .......... 381/94; 381/37; 381/47

[58] Field of Search .......... 381/94, 37, 46, 47; 379/406, 392

[56] References Cited

U.S. PATENT DOCUMENTS

| | | | |
|---|---|---|---|
| 4,628,529 | 12/1986 | Borth et al. . | |
| 4,630,304 | 12/1986 | Borth et al. . | |
| 4,630,305 | 12/1986 | Borth et al. . | |
| 4,811,404 | 3/1989 | Vilmur et al. . | |
| 4,837,832 | 6/1989 | Fanshel | 381/94 |
| 5,012,519 | 4/1991 | Adlersberg et al. . | |
| 5,023,906 | 6/1991 | Novas | 379/386 |
| 5,133,013 | 7/1992 | Munday | 381/47 |
| 5,251,263 | 10/1993 | Andrea et al. | 381/94 |

FOREIGN PATENT DOCUMENTS

0459362A1 12/1991 European Pat. Off. .

OTHER PUBLICATIONS

McAulay, Robert J., "Speech Enhancement Using a Soft-Decision Noise Suppression Filter," *IEEE Transactions on Acoustics, Speech, and Signal Processing,* vol. ASSP-28, No. 2, Apr. 1980.

Lim, Jae S. and Oppenheim, Alan V., "Enhancement and Bandwidth Compression of Noisy Speech," *Proceedings of the IEEE,* vol 67 No. 12, Dec. 1979.

Chan, Wai-Yip and Falconer, David D., "Speech Detection for a Voice/Data Mobile Radio Terminal", *1988 IEEE,* pp. 1650–1654.

Narayan, S. Shankar; Peterson, Allen M.; Narasimha, Madihally, "Transform Domain LMS Algorithm," *IEEE Transactions on Acoustics, Speech, and Signal Processing,* vol. ASSP-31, No. 3 Jun. 1983.

Shynk, John J., "Frequency-Domain and Multirate Adaptive Filtering," *IEEE SP Magazine,* Jan. 1992.

*Primary Examiner*—Curtis Kuntz
*Assistant Examiner*—Ping W. Lee
*Attorney, Agent, or Firm*—Cesari and McKenna

[57] ABSTRACT

A noise-suppression circuit (10) divides the signal from a microphone (12) into a plurality of frequency subbands by means of a noise-band divider (18) and a subtraction circuit (36). By means of gain circuits (32) and (34), it applies separate gains to the separate bands and then recombines them in a signal combiner (38) to generate an output signal in which the noise has been suppressed. Separate gains are applied only to the lower subbands in the voice spectrum. Accordingly, the noise-band divider (18) is required to compute spectral components for only those bands. By employing a sliding-discrete-Fourier-transform method, the noise-band divider (18) computes the spectral components on a sample-by-sample basis, and circuitry (50, 52) for determining the individual gains can therefore update them on a sample-by-sample basis, too.

16 Claims, 3 Drawing Sheets

NOISE-REDUCTION SYSTEM

BACKGROUND OF THE INVENTION

The present invention is directed to electronic devices for suppressing background noise of the type that, for example, occurs when a mobile-telephone user employs a hands-free telephone in an automobile.

A mobile-cellular-telephone user's voice often has to compete with traffic and similar noise, which tends to reduce the intelligibility of the speech that his cellular telephone set transmits from his location. To reduce this noise, a general type of noise-suppression system has been proposed in which the signal picked up by the microphone (i.e., speech plus noise) is divided into frequency bins, which are subjected to different gains before being added back together to produce the transmitted signal. (Of course, this operation can be performed at the receiving end, but for the sake of simplicity we will describe it only as occurring at the transmitter end.) The different gains are chosen by reference to estimates of the relationship between noise and voice content in the various bins: the greater the noise content in a given bin, the lower the gain will be for that bin. In this way, the speech content of the signal is emphasized at the expense of its noise content.

The noise-power level is estimated in any one of a number of ways, most of which involve employing a speech detector to identify intervals during which no speech is present and measuring the spectral content of the signal during those no-speech intervals.

Properly applied, this use of frequency-dependent gains does increase the intelligibility of the received signal. It nonetheless has certain aspects that tend to be disadvantageous. In the first place, many implementations tend to be afflicted with "flutter." A certain minimum record, or frame, of input signal is required in order to divide it into the requisite number of frequency bands, and the abrupt changes in the gain values at the end of each such record during non-speech intervals can cause a fluttering sound, which users find annoying. Methods exist for alleviating this problem, but they tend to have drawbacks of their own. For instance, some systems temporally "smooth" the gain values between input records by incrementally changing the gains, at each sample time during a frame, toward the gain dictated by the computation at the end of the last frame. This approach does largely eliminate the flutter problem, but it also reduces the system's responsiveness to changing noise conditions.

One could solve the frame problem by using a bank of parallel bandpass filters, each of which continually computes the frequency content of its respective band. But most commonly used bandpass-filter implementations would make obtaining the necessary resolution and reconstructing the gain-adjusted signals prohibitively computation-intensive for many applications.

Another drawback of conventional implementations of this general approach is that they distort the speech signal: the relative amplitudes of the frequency components in the transmitted signal are not the same as they were in the signal that the microphone received.

SUMMARY OF THE INVENTION

The present invention reduces these effects while retaining the benefits of the frequency-dependent-gain approach.

One aspect of the present invention, which is particularly applicable to mobile-cellular-telephone installations, takes advantage of the fact that background noise in automobile environments tends to predominate in the lower-frequency part of the speech band, while the information content of the speech falls disproportionately in the higher-frequency part. According to this aspect of the invention, gains are separately determined for different bands in the lower-frequency regions, as is conventional. But in the upper-frequency bins, which carry a significant part of the intelligibility, gains for different bins are kept equal. As a result, fewer Fourier components and fewer gain values need to be computed, but most of the noise-suppression effect remains, since it is the lower bands that ordinarily contain the most noise. Moreover, this approach can avoid most of the distortion that afflicts conventional frequency-dependent-gain approaches.

In employing this approach, we favor use of a gain function that approximates the maximum-likelihood function for high signal-to-noise ratios but approaches a predetermined value between −6 db and −20 db for low signal-to-noise ratios.

In accordance with another aspect of the invention, the gains to be employed for the various frequency bins are re-computed from the current noise contents at each sample time rather than only once each frame. This largely eliminates the flutter problem without detracting from the system's responsiveness to changing conditions. Without the present invention, such an approach might prove computationally prohibitive, because the frames used to compute the contents of the various frequency bins have to be heavily overlapped. In accordance with the present invention, however, the computation is performed by virtue of the "sliding discrete Fourier transform," whereby a Fourier component for a transform of an input record that ends with a given sample is computed from that sample, the corresponding Fourier component computed for the same-length frame that ended with the previous sample, and the sample with which that same-length frame began. That is, $$X(i,k)=x(i)-x(i-N)+e^{-j2\pi k/N}X(i-1,k), \quad (1)$$

where X(i,k) is the kth frequency component in an N-point discrete Fourier transformation taken over a record that ends with the ith sample, and x(i) is the ith sample of an input signal x from which the transform X is computed. By employing this "sliding DFT," as it is known in some signal-processing contexts, the computational burden that would otherwise result from re-computing the gains at each sample time is greatly reduced.

In accordance with yet another aspect of the invention, the speech detector determines whether speech is present by comparing with a threshold value an average of a plurality of factors $\rho_k$ associated with respective frequency bins. Each $\rho_k$ factor is the result of computing a first average of the Fourier components associated with that factor's associated frequency bin for samples that include those taken when the speech detector has indicated the presence of speech, computing a second average of Fourier components associated with that frequency bin for samples taken when the speech detector has indicated the absence of speech, and taking $\rho_k$ as the ratio that the difference between the first and second averages bears to the first average.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
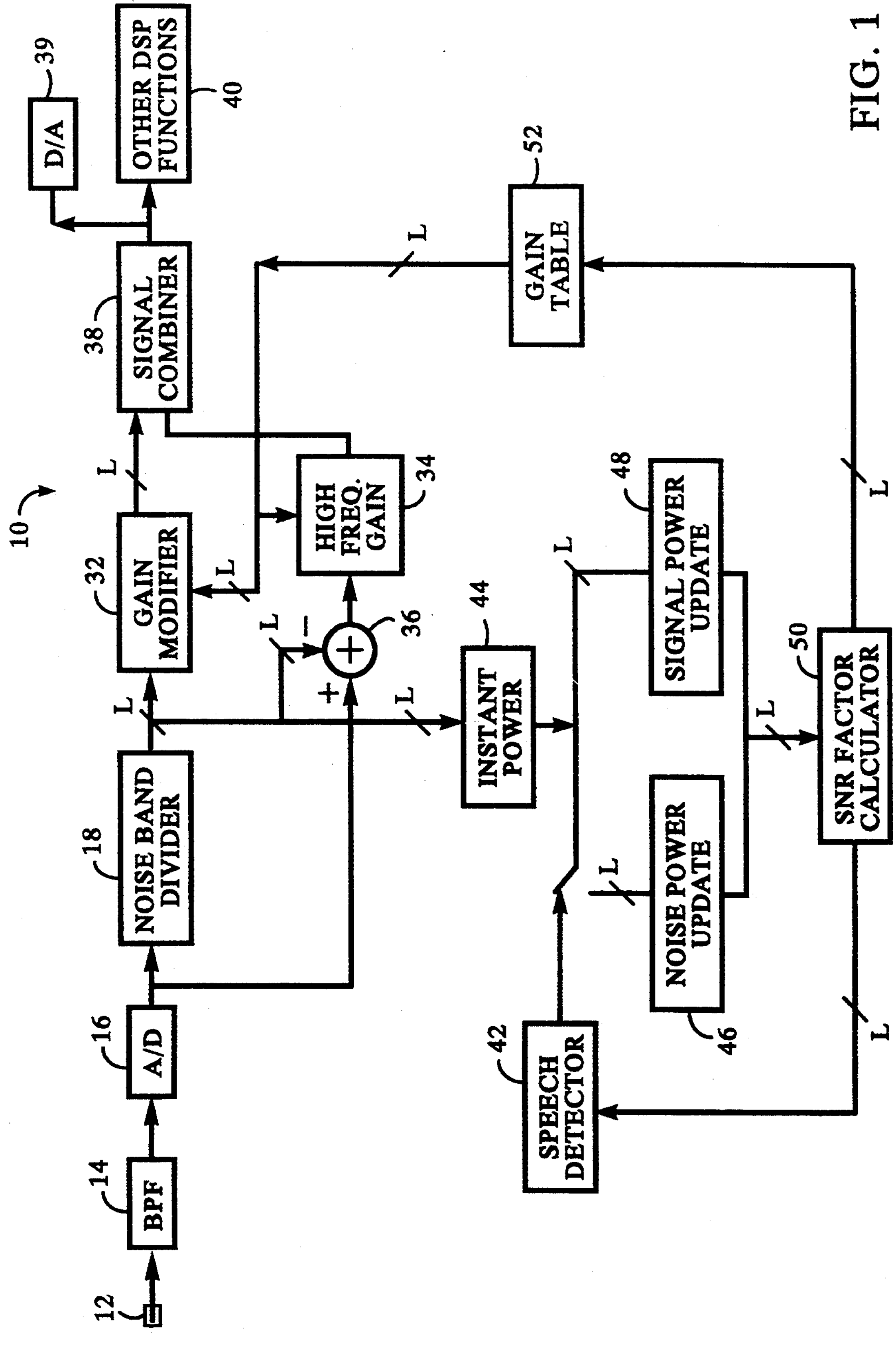
FIG. 1 is a block diagram of the front-end audio-frequency section of a mobile cellular-telephone transmitter that embodies the teachings of the present invention.

In the transmitter 10 of FIG. 1, a microphone 12 converts an incoming acoustic signal into electrical form, and a band-pass filter 14 restricts the spectrum of the resultant signal to a portion of the audible band in which speech ordinarily occurs. An analog-to-digital converter 16 samples the resultant, filtered signal at a rate sufficient to avoid aliasing, and it converts the samples into digital form. A band divider 18 then determines the contents of various frequency bands of the signal that the incoming digital sequence represents.

Certain previous noise-suppression arrangements of this general type perform this division into frequency bands in the analog domain; they use analog bandpass filters. For many applications, however, the size and cost penalties exacted by such an arrangement would be prohibitive, so the division into bands must be performed digitally, preferably by obtaining a discrete Fourier transform (DFT). But to obtain Fourier components spaced by, for instance, 100 Hz, the transformation computation must be performed on records that are at least 10 msec in length, and greater frequency resolution requires even longer records for each computation. In the past, this has resulted in a tendency to produce flutter, whose elimination, as was explained above, required either a reduction in responsiveness or a potentially prohibitive increase in computational burden.

Figure 2:
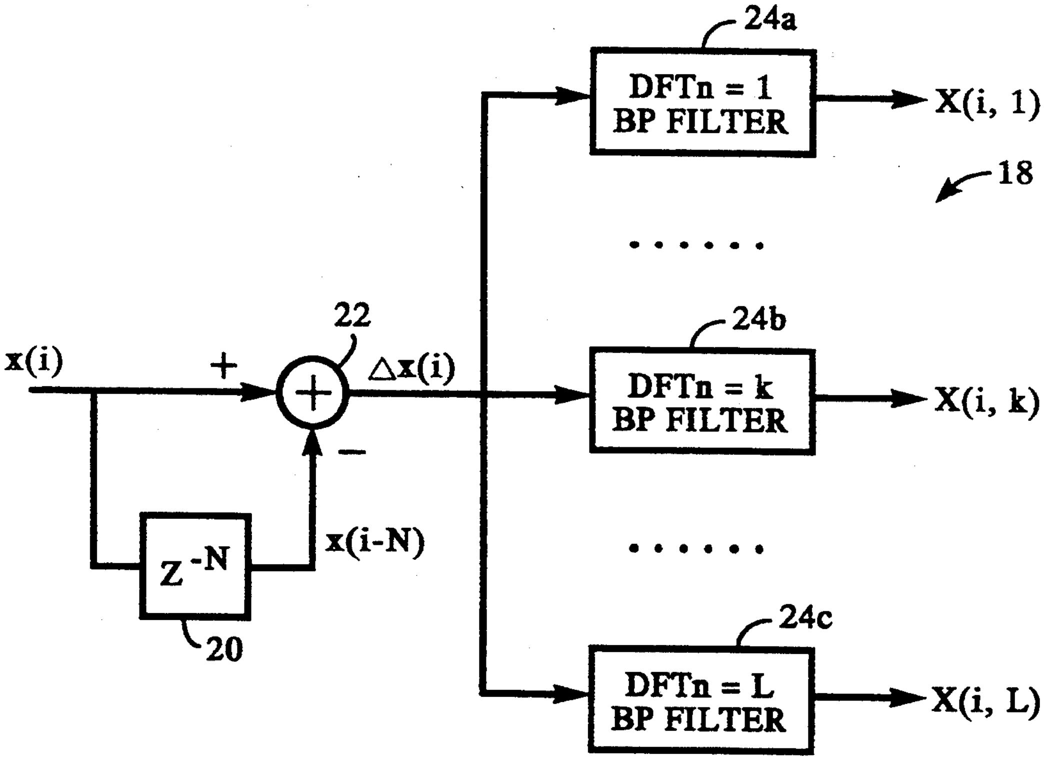
FIG. 2 is a block diagram of the band divider that the transmitter of FIG. 1 employs.
Figure 3:
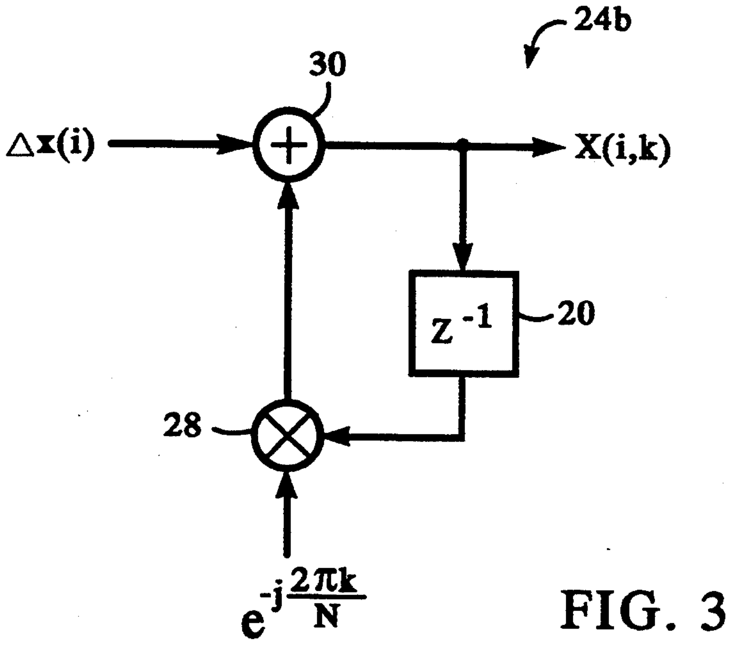
FIG. 3 is a block diagram of one of the recursive filters employed in the band divider of FIG. 2.

In accordance with the present invention, however, the band divider 18 performs the DFT calculation by using the sliding-DFT approach based on the recursive computation defined by equation (1). FIGS. 2 and 3 depict a way of implementing this computation.

As FIG. 2 shows, the band divider 18 is a sliding-DFT circuit. It includes an N-stage delay line 20, where N is the number of samples in the record required to produce the desired frequency resolution. Block 22 in FIG. 2 represents subtraction of the N-delayed input sequence to produce a difference signal Δx(i), which is a common input to filters 24*a*, 24*b*, and 24*c*, each of which performs the function of recursively computing a different Fourier component X(i,k).

FIG. 3 depicts filter 24*b* in detail. As FIG. 3 shows, that filter is implemented simply by a single-stage delay 26, one complex multiplier 28, and one complex adder 30, which together recursively compute the contents of a frequency bin for a frame that ends with the current sample period in accordance with equation (1).

We digress at this point to note that, although FIGS. 2 and 3 depict the computations for the various frequency bins in accordance with our invention as being performed in parallel, typical embodiments of the invention will implement these filters and the other digital circuitry in FIG. 1 in a single digital signal processor so that common hardware will embody the various circuits. Many of the computations that are shown conceptually as occurring in parallel will, strictly speaking, be performed serially.

As is conventional in this general class of noise-suppression circuits, a frequency-dependent-gain circuit 32 multiplies the different frequency-bin contents by respective, typically different gain values. According to one aspect of the present invention, however, individually determined (and thus potentially different) gains are applied only to L lower-frequency bins, where L is a number of bins that spans only part of the spectrum having significant contents, whereas a conventional arrangement would compute separate gains for all such bins.

Specifically, a single multiplication block 34 applies a common gain, determined in a manner that will be described below, to the sum of the real parts of the higher-frequency bins. This sum is obtained by adder 36, which subtracts from each time-domain input sample the sum (scaled by ½N) of the real parts of the Fourier components corresponding to the L lowest-frequency bins. A signal-combining circuit 38 adds the result of the multiplier-34 operation to the sum of the outputs of gain circuit 32 to produce the frequency-suppressed time-domain signal, which can be converted back to analog form by means of a digital-to-analog converter 39 or, more typically, subjected to other digital-signal-processing functions, represented by block 40, required for the particular transmission protocol employed.

As was mentioned above, gain circuits 32 and 34 as well as subtraction circuit 36 all operate on only the real parts of the Fourier coefficients, and the signal combiner 38 generates the output signal merely by adding together the gain-adjusted versions of these real parts without an explicit transformation from the frequency domain to the time domain. To understand this, first consider the straightforward result of transforming the Fourier transform back into the time domain:

$$y(i-p)=\frac{1}{N}\sum_{k=0}^{N-1}X(i,k)e^{j\frac{2\pi pk}{N}}, \qquad (2)$$

where y is the time-domain result of the inverse-transformation process and X(i,k) is the kth Fourier component computed over the N-point input record that ends at the ith sample. Without gain modification, of course, y=x. Note that, because of the particular way in which we choose to implement the sliding-DFT algorithm, the proper inverse transformation is reversed in time order from that of the usual DFT convention.

Because of filter 14, we know that at least X(i,O) and X(i,N/2) will be negligible. We can take advantage of this fact and the symmetry property X(i,k)=X*(i,N-k) that results from the fact that the input sequence x(i) is purely real to arrive at the following expression for the inverse transform:

$$y(i-p)=\frac{2}{N}\sum_{k=1}^{(N/2)-1}\left[Re\{X(i,k)\}\cos\left(\frac{2\pi pk}{N}\right)-\right. \qquad (3)$$

-continued $$Im\{X(i,k)\}\sin\left(\frac{2\pi pk}{N}\right)\Bigg].$$

We now take into account the effect of the frequency-dependent gains by multiplying each frequency component by its respective gain G(i,k) computed for the kth frequency bin at the ith time interval:

$$y(i-p)=\frac{2}{N}\sum_{k=1}^{(N/2)-1}G(i,k)\left[Re\{X(i,k)\}\cos\left(\frac{2\pi pk}{N}\right)-Im\{X(i,k)\}\sin\left(\frac{2\pi pk}{N}\right)\right].\qquad(4)$$

At each sample time, however, we are interested only in y(i), rather than the whole time-domain sequence. That is, we need to evaluate equation (4) only for p=0. This means that $e^{j2\pi pk/N}=1$, so the current output sample is simply the sum of the results of multiplying the real parts of the Fourier components by their respective gains:

$$y(i)=\frac{2}{N}\sum_{k=1}^{(N/2)-1}G(i,k)Re\{X(i,k)\}.\qquad(5)$$

Thus, time-domain values can be obtained simply by adding together the (scaled) real parts of the frequency-domain values; explicit computation of the inverse transform of equation (2) is not necessary.

We now turn to the manner in which the individual gains G(i,k) are computed. The general approach is to observe the signal power that is present in the various frequency bins while speech is not present. The power thus observed will be considered the respective frequency bins' noise contents, and the gain for a frequency bin will decrease with increased noise. This is the general approach commonly used in noise-suppression arrangements of this type.

Explanation of the particular manner in which we implement this general approach begins with the assumption that a speech detector 42 has determined that speech is absent. A power-computation circuit 44 computes a power value P(i,k)=X(i,k)X*(i,k) for each frequency bin, where the asterisk denotes complex conjugation, and the absence of speech causes the P(i,k) outputs to be applied to a noise-power-update circuit 46. This circuit computes an exponential average of the power present in each bin during periods of speech absence. If the speech detector 42 indicates that speech is absent at time i but that speech was present at time i-1, then circuit 46 computes a bin noise-power level N(i,k) from the P(i,k) and the noise-power level similarly determined at the last time q at which the speech detector 42 indicated the absence of speech:

$$N(i,k)=\lambda_N[N(q,k)-P(i,k)]+P(i,k),\qquad(6)$$

where $\lambda_N$ is a forgetting factor employed for the exponential averaging.

Otherwise, the average noise-power level N(i,k) for sample time i is computed from its value at the previous sample time and the current bin power value P(i,k):

$$N(i,k)=\lambda_N[N(i-1,k)-P(i,k)]+P(i,k).\qquad(7)$$

Regardless of whether the speech detector 42 indicates that speech is present, a signal-power-update circuit 48 computes for each bin an exponential average E(i,k) of the power P(i,k) for that bin:

$$E(i,k)=\lambda_s[E(i-1,k)-P(i,k)]+P(i,k),\qquad(8)$$

where $\lambda_s$ is the exponential-average forgetting factor for the signal-power computation.

Both the gain and the speech-detection determinations in the illustrated embodiment are based on a factor $\rho_k$, which is roughly related to the signal-to-noise ratio of the kth bin:

$$\rho_k=\begin{cases}\dfrac{E(i,k)-N(i,k)}{E(i,k)}, & E(i,k)>N(i,k)\\ 0, & E(i,k)<N(i,k).\end{cases}\qquad(9)$$

Block 50 represents the $\rho_k$ computation. The speech detector 42 makes its decision based on a comparison between a threshold value $\rho_{th}$ and the mean value $\rho_{ave}$ of the $\rho_k$'s in the L bands for which gains are individually determined:

$$\rho_{ave}=\frac{1}{L}\sum_{k=1}^{L}\rho_k.\qquad(10)$$

If $\rho_{ave}$ is less than $\rho_{th}$, the speech detector 42 indicates that speech is absent. Otherwise, it indicates that speech is present.

Figure 4:
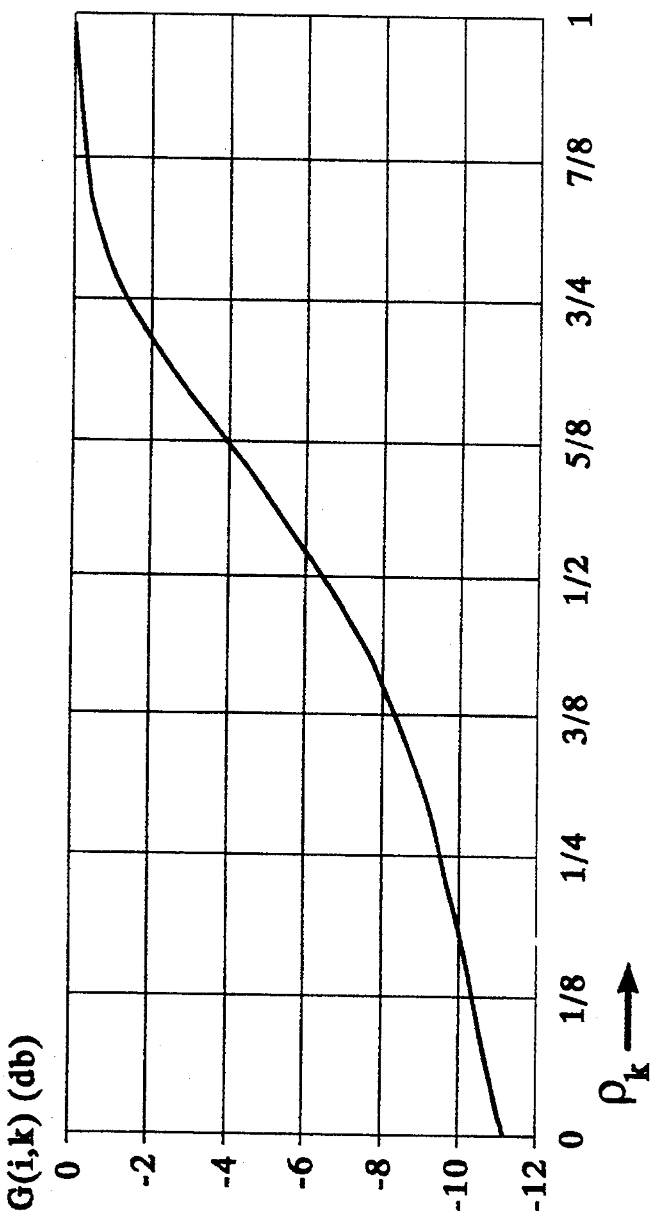
FIG. 4 is a graph that depicts the gain table by which the transmitter of FIG. 1 assigns gains to various frequency bins.

A gain-value generator 52 determines the individual gains G(i,k) of the L low-frequency bins in accordance with a gain table that FIG. 4 depicts. For $\rho_k$ values that correspond to a high signal-to-noise ratios, the table entries approximate the maximum-likelihood values discussed, for example, in McAulay and Malpass, "Speech Enhancement Using a Soft-Decision Noise Suppression Filter," *IEEE Trans. Acoustics, Speech, and Signal Processing,* vol. ASSP-28, no. 2, Apr. 1980, pp. 137–145, particularly equation (31). For lower SNR values, the table departs from these values, approaching a lower limit determined empirically to produce desirable results. In the illustrated embodiment, that limit is −11 db, but this subjectively determined lower limit could assume other values between −6 db and −20 db. Again, the gain-value generator 52, as well as all of the other circuits in FIG. 1 except for the microphone 12 and bandpass filter 14, would typically be embodied in the common circuitry of a single digital-signal-processing chip.

While we employ the gain table to assign gains individually to the L lower-frequency bins, the gain applied in block 34 to the higher-frequency bins is simply the highest of any of the L gains employed at that sample time. This results from our recognition that noise in automobile environments tends to predominate in the parts of the spectrum below about 1000 Hz, while much of the information content in the speech signal occurs above that frequency level. Therefore, by computing individual spectral contents and gains for only the "noise band" below 1000 Hz, we have greatly reduced the computation required for this type of noise suppression. Rather than computing, say, twenty-one spectral components in order to achieve 125-Hz resolution, the present invention requires computing separate gains and spectral components for only six bins at that resolution and yet achieves most of the noise suppression that would result from separate computation of all bins.

Of course, the 1000-Hz value is not critical, and some of the value of the present invention can be obtained without requiring that gains for absolutely all lower-frequency bins be determined separately or that a single gain be determined for absolutely all higher-frequency bins. However, we believe that the gains for at least a plurality of the frequency bins above 800 Hz should be commonly determined and that those for at least a plurality below 1500 Hz should be determined separately.

The noise suppression is obtained with much less noticeable speech distortion than would otherwise result from the different gain values. Moreover, by employing a sliding-DFT method to obtain the various spectral components, we are able to compute the output without an explicit re-transformation into the time domain and without the potentially prohibitive computational burden that, for instance, a fast-Fourier-transform algorithm would require for the sample-by-sample gain-value updates that we perform. The present invention thus constitutes a significant advance in the art.

What is claimed is:

1. For reducing the noise content of a sampled input signal consisting of a sequence of input samples, a noise-reduction circuit comprising:

A) a speech detector for determining whether the input signal includes speech and generating a speech-detector output that indicates whether speech is present or absent in the input signal;

B) a sliding-discrete-Fourier-transform circuit for recursively computing, for each sample, the values of at least a plurality of the components of the discrete Fourier transform of a sample sequence that ends with that sample, each such Fourier-component value, denominated a raw Fourier-component value, thereby being associated with a respective frequency bin;

C) a gain-value generator, responsive to the speech-detector output and the computed Fourier components, for generating, from the frequency components associated with each of a plurality of the frequency bins, a gain value associated with that frequency bin by comparing a function of those components computed for samples that include those taken when the speech detector indicated the presence of speech with those components computed only for samples taken when the speech detector indicated the absence of speech;

D) a gain-adjustment circuit for generating an adjusted-Fourier-component value for each bin by multiplying the raw Fourier-component value associated with each bin by the gain value generated for that bin; and E) an output circuit for generating an output from the adjusted frequency-bin values.

2. A noise-reduction circuit as defined in claim 1 wherein the gains for at least a first plurality of the frequency bins above 800 Hz are the same while those for at least a second plurality of the frequency bins below 1500 Hz are not in general the same.

3. A noise-reduction circuit as defined in claim 2 wherein the gain value for the plurality of frequency bins whose gains are the same is equal to the greatest of the gains of all lower-frequency bins.

4. A noise-reduction circuit as defined in claim 3 wherein the gain-value generator generates the gain value for each of a plurality of frequency bins by computing a first average of the Fourier components associated with that frequency bin for samples that include those taken when the speech detector indicates the presence of speech, computing a second average of the Fourier components associated with that frequency bin for samples taken when the speech detector indicates the absence of speech, and generating as the gain value for that bin a predetermined function of the ratio that the difference between the first and second averages bears to the first average.

5. A noise-reduction circuit as defined in claim 4 wherein the predetermined function yields gain values that approximate maximum-likelihood gain values as the ratio approaches unity and approaches a predetermined value between −6 db and −20 db as the ratio approaches zero.

6. A noise-reduction circuit as defined in claim 1 wherein the gain-value generator generates the gain value for each of a plurality of frequency bins by computing a first average of the Fourier components associated with that frequency bin for samples that include those taken when the speech detector indicates the presence of speech, computing a second average of the Fourier components associated with that frequency bin for samples taken when the speech detector indicates the absence of speech, and generating as the gain value for that bin a predetermined function of the ratio that the difference between the first and second averages bears to the first average.

7. A noise-reduction circuit as defined in claim 6 wherein the predetermined function yields gain values that approximate maximum-likelihood gain values as the ratio approaches unity and approaches a predetermined value between −6 db and −20 db as the ratio approaches zero.

8. A noise-reduction circuit as defined in claim 1 wherein the speech detector indicates that speech is present when a value $\rho_{ave}$ exceeds a predetermined threshold value and the speech detector indicates the absence of speech when $\rho_{ave}$ is less than the predetermined threshold, where $\rho_{ave}$ is the average of a plurality of factors $\rho_k$ associated with respective frequency bins, each factor $\rho_k$ associated with a given frequency bin being the result of computing a first average of the Fourier components associated with that frequency bin for samples that include those taken when the speech detector has indicated the presence of speech, computing a second average of the Fourier components associated with that frequency bin for samples taken when the speech detector has indicated the absence of speech, and taking as $\rho_k$ the ratio that the difference between the first and second averages bears to the first average.

9. For reducing the noise content of a sampled input signal consisting of a sequence of input samples, a noise-reduction circuit comprising:

A) a speech detector for determining whether the input signal includes speech and generating a speech-detector output that indicates whether speech is present or absent in the input signal;

B) a discrete-Fourier-transform circuit for computing, for each sample, at least a plurality of the components of the discrete Fourier transform of a sample sequence that ends with that sample, each such Fourier component thereby being associated with a respective frequency bin;

C) a gain-value generator, responsive to the speech-detector output and the computed Fourier components, for generating, from the frequency components associated with each of a plurality of the frequency bins, a gain value associated with that frequency bin by comparing a function of those components computed for samples taken when the speech detector indicated the presence of speech with those components computed for samples taken when the speech detector indicated the absence of speech, the gains for at least a first plurality of the frequency bins above 800 Hz being the same and those for at least a second plurality of the frequency bins below 1500 Hz not in general being the same;

D) a gain-adjustment circuit for generating an adjusted-Fourier-component value for each bin by multiplying the raw Fourier-component value associated with each bin by the gain value generated for that bin; and E) an output circuit for generating an output from the adjusted frequency-bin values.

10. A noise-reduction circuit as defined in claim 9 wherein the gain value for the plurality of frequency bins whose gains are the same is equal to the greatest of the gains of all lower-frequency bins.

11. A noise-reduction circuit as defined in claim 10 wherein the gain-value generator generates the gain value for each of a plurality of frequency bins by computing a first average of the Fourier components associated with that frequency bin for samples that include those taken when the speech detector indicates the presence of speech, computing a second average of the Fourier components associated with that frequency bin for samples taken when the speech detector indicates the absence of speech, and generating as the gain value for that bin a predetermined function of the ratio that the difference between the first and second averages bears to the first average.

12. A noise-reduction circuit as defined in claim 11 wherein the predetermined function yields gain values that approximate maximum-likelihood gain values as the ratio approaches unity and approaches a predetermined value between −6 db and −20 db as the ratio approaches zero.

13. A noise-reduction circuit as defined in claim 9 wherein the gain-value generator generates the gain value for each of a plurality of frequency bins by computing a first average of the Fourier components associated with that frequency bin for samples that include those taken when the speech detector indicates the presence of speech, computing a second average of the Fourier components associated with that frequency bin for samples taken when the speech detector indicates the absence of speech, and generating as the gain value for that bin a predetermined function of the ratio that the difference between the first and second averages bears to the first average.

14. A noise-reduction circuit as defined in claim 13 wherein the predetermined function yields gain values that approximate maximum-likelihood gain values as the ratio approaches unity and approaches a predetermined value between −6 db and −20 db as the ratio approaches zero.

15. A noise-reduction circuit as defined in claim 9 wherein the speech detector indicates that speech is present when a value $\rho_{ave}$ exceeds a predetermined threshold value and the speech detector indicates the absence of speech when $\rho_{ave}$ is less than the predetermined threshold, where $\rho_{ave}$ is the average of a plurality of factors $\rho_k$ associated with respective frequency bins, each factor $\rho_k$ associated with a given frequency bin being the result of computing a first average of the Fourier components associated with that frequency bin for samples that include those taken when the speech detector has indicated the presence of speech, computing a second average of the Fourier components associated with that frequency bin for samples taken when the speech detector indicates the absence of speech, and taking as $\rho_k$ the ratio that the difference between the first and second averages bears to the first average.

16. In a noise-reduction circuit, adapted to receive a sampled input signal consisting of a sequence of input samples, that includes a speech detector for determining whether the input signal includes speech and generating a speech-detector output that indicates whether speech is present or absent in the input signal and circuitry responsive to the speech-detector output and the input signal for processing the input signal to generate as an output signal a noise-reduced version of the input signal, the improvement wherein the speech detector comprises means for indicating the absence of speech when $\rho_{ave}$ is less than a predetermined threshold, where $\rho_{ave}$ is the average of a plurality of factors $\rho_k$ associated with respective frequency bins, each factor $\rho_k$ associated with a given frequency bin being the result of computing a first average of the Fourier components associated with that frequency bin for samples that include those taken when the speech detector has indicated the presence of speech, computing a second average of the Fourier components associated with that frequency bin for samples taken when the speech detector has indicated the absence of speech, and taking as $\rho_k$ the ratio that the difference between the first and second averages bears to the first average.

* * * * *